(12) United States Patent
Wang et al.

(10) Patent No.: US 8,441,649 B2
(45) Date of Patent: May 14, 2013

(54) MULTI-BEAM INTERFEROMETER DISPLACEMENT MEASURING SYSTEM UTILIZED IN A LARGE MEASURING RANGE

(75) Inventors: Yung-Cheng Wang, Douliou (TW); Lih-Horng Shyu, Douliou (TW); Chung-Ping Chang, Douliou (TW); Pi-Cheng Tung, Douliou (TW)

(73) Assignee: National Yunlin University of Science and Technology, Douliou, Yunlin County (TW)

( * ) Notice: Subject to any disclaimer, the term of this patent is extended or adjusted under 35 U.S.C. 154(b) by 380 days.

(21) Appl. No.: 12/926,697

(22) Filed: Dec. 6, 2010

(65) Prior Publication Data
US 2011/0157598 A1    Jun. 30, 2011

(30) Foreign Application Priority Data
Dec. 24, 2009   (TW) .............................. 98144696 A

(51) Int. Cl.
*G01B 9/02*    (2006.01)
(52) U.S. Cl.
USPC .......................................................... 356/493
(58) Field of Classification Search .................. 356/491, 356/493, 498
See application file for complete search history.

(56) References Cited

U.S. PATENT DOCUMENTS

| | | | |
|---|---|---|---|
| 7,212,290 B2* | 5/2007 | Fine et al | 356/495 |
| 2003/0038947 A1* | 2/2003 | Hill | 356/493 |
| 2005/0195404 A1* | 9/2005 | Carlson | 356/493 |

* cited by examiner

*Primary Examiner* — Tari Fur Chowdhury
*Assistant Examiner* — Jonathan Hansen
(74) *Attorney, Agent, or Firm* — Bacon & Thomas, PLLC

(57) ABSTRACT

A multi-beam interferometer displacement measuring system has a light source module, a resonator module and a detecting device. The light source module has an emitter and a polaroid sheet. The emitter emits a non-polarizing beam. The polaroid sheet receives and transforms the non-polarizing beam into a polarizing beam. The resonator module receives the polarizing beam and has a coated glass panel, a corner cube prism and a wave-delay plate. The coated glass panel receives and reflects the polarizing beam. The corner cube prism receives and reflects the polarizing beam to the coated glass panel to form a resonant cavity. The wave-delay plate is mounted between the coated glass panel and the corner cube prism to receive the polarizing beam. The detecting device faces the coated glass panel to receive the interferential stripes formed in the resonator module and has a polarizing beam splitter, two power detectors and a signal processor.

7 Claims, 6 Drawing Sheets

MULTI-BEAM INTERFEROMETER DISPLACEMENT MEASURING SYSTEM UTILIZED IN A LARGE MEASURING RANGE

BACKGROUND OF THE INVENTION

1. Field of the Invention

The present invention relates to a multi-beam interferometer displacement measuring system, and more particularly to a multi-beam interferometer displacement measuring system utilized in a large measuring range. The multi-beam interferometer displacement measuring system is insensitive to the tilt angle and the environmental disturbances and can realize the high precision displacement in a large measuring range under an uncomplicated measuring condition.

2. Description of Related Art

To develop high resolution of the conventional measuring system or apparatus is the focal point of research in the precision industries and the photoelectric enterprises. A conventional photoelectric measuring apparatus can be classified into two kinds based on the measuring method: one is a laser interferometer and the other is an interferometric range finder. The conventional interferometric range finder further has a homodyne multi-beam interferometer and a heterodyne multi-beam interferometer. The conventional homodyne multi-beam interferometer may be a Michelson interferometer (with a resolution of 1.24 nanometers), has an uncommon optical path structure and will be sensitive to the environmental disturbances and the thermal current effect of temperature and this will affect the visibility of the interferential stripes.

The conventional heterodyne multi-beam interferometer has a common optical path structure and is resistive to the environmental disturbances and vibrations. With reference to FIG. 6, a Fabry-Perot interferometer 60 is one kind of the conventional multi-beam interferometers and is used to measure displacement by two approximately parallel planar mirrors 61, 62. Multiple interferential stripes will be distinctly formed between the planar mirrors 61, 62 of the conventional Fabry-Perot interferometer 60 and this can enable the positions of the interferential stripes to measure displacement precisely. Consequently, the resolution and the measuring precision of the conventional Fabry-Perot interferometer 60 will be better than that of the conventional homodyne multi-beam interferometer.

When the measuring distance between the planar mirrors 61, 62 of the conventional Fabry-Perot interferometer 60 is too long (if the measuring distance between the planar mirrors 61, 62 is at the scale of micrometer), the planar mirrors 61, 62 will not be parallel with each other and will form a tilt angle between the planar mirrors 61, 62. However, the tilt angle will alter the intervals and the contrast of the interferential stripes formed between the planar mirrors 61, 62 of the conventional Fabry-Perot interferometer 60 and this will affect the accuracy of the measuring result. Thus, the measuring range of the conventional Fabry-Perot interferometer 60 is constrained in micrometers and is hard to perform displacement measurement in the large range.

A multi-beam interferometer displacement measuring system utilized in a large measuring range in accordance with the present invention mitigates or obviates the aforementioned problems.

SUMMARY OF THE INVENTION

The main objective of the present invention is to provide a multi-beam interferometer displacement measuring system utilized in the large measuring range; the multi-beam interferometer displacement measuring system is insensitive to the tilt angle and the environmental disturbances and can realize the high precision displacement in a large measuring range under an uncomplicated measuring condition.

The multi-beam interferometer displacement measuring system utilized in the large measuring range in accordance with the present invention has a light source module, a resonator module and a detecting device. The light source module has an emitter and a polaroid sheet. The emitter emits a non-polarizing beam. The polaroid sheet receives and transforms the non-polarizing beam into a polarizing beam. The resonator module receives the polarizing beam of the light source module and has a coated glass panel, a corner cube prism and a wave-delay plate. The coated glass panel receives and reflects the polarizing beam and the polarizing beam transmits through the coated glass panel. The corner cube prism movably faces the coated glass panel, receives and reflects the polarizing beam to the coated glass panel to form a resonant cavity between the coated glass panel and the corner cube prism. The wave-delay plate is mounted between the coated glass panel and the corner cube prism to receive the polarizing beam. The detecting device faces the coated glass panel opposite the corner cube prism, is used to receive the interferential stripes formed in the resonator module and has a polarizing beam splitter, two power detectors and a signal processor.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
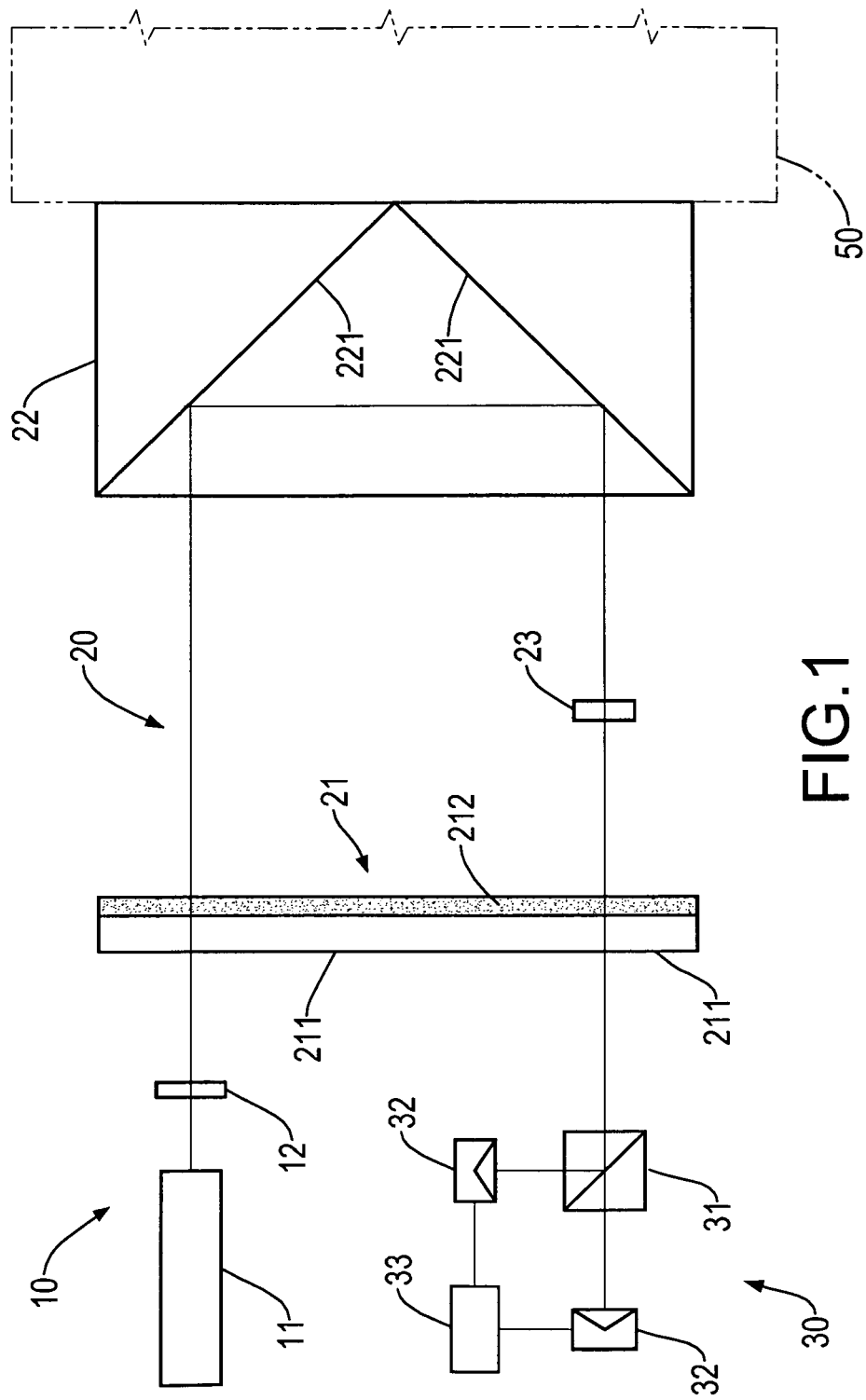
FIG. 1 is a side view of a multi-beam interferometer displacement measuring system in accordance with the present invention.

With reference to FIG. 1, a multi-beam interferometer displacement measuring system utilized in a large measuring range in accordance with the present invention has a light source module 10, a resonator module 20 and a detecting device 30.

The light source module 10 has an emitter 11 and a polaroid sheet 12. The emitter 11 can emit a non-polarizing beam and may be a helium-neon laser (He—Ne Laser). The wavelength of the He—Ne Laser is 632.9907 nanometers (nm). Preferably, the non-polarizing beam emitted from the He—Ne laser can be collimated to make the multi-beam interferometer displacement measuring system obtain a preferred measuring effect. The polaroid sheet 12 is used to receive the non-polarizing beam emitted from the emitter 11 and transforms the non-polarizing beam into a polarizing beam (including a horizontal polarizing beam or a vertical polarizing beam emitted through the polaroid sheet 12).

The resonator module 20 is used to receive the polarizing beam of the light source module 10 and has a coated glass panel 21, a corner cube prism 22 and a wave-delay plate 23.

The coated glass panel 21 is mounted away from the polaroid sheet 12 opposite the emitter 11 to receive the polarizing beam of the light source module 10, is used to reflect the polarizing beam back to the polaroid sheet 12 and the polarizing beam transmitted through the coated glass panel 21. The coated glass panel 21 has a glass panel 211 and a coating membrane 212. The glass panel 211 faces the polaroid sheet 12 opposite the emitter 11 and has a front side and a rear side. The front side of the glass panel 211 faces the polaroid sheet 12 opposite the emitter 11. The coating membrane 212 is mounted on the rear side of the glass panel 211, is used to reflect the polarizing beam of the light source module 10 back to the polaroid sheet 12 and has a reflection ratio of R % (R is a parameter).

Figure 2:
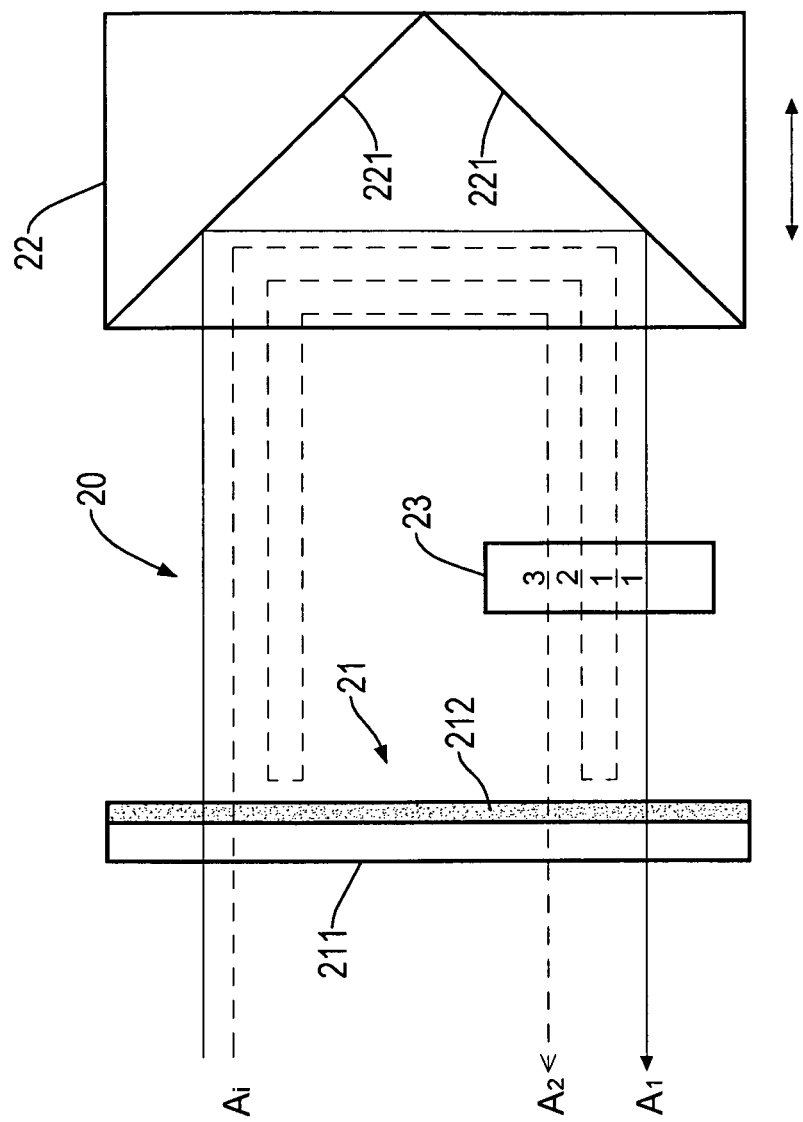
FIG. 2 is an operational side view of the optical paths of the multi-beam interferometer displacement measuring system in FIG. 1.

The corner cube prism 22 (CCR) movably faces the coating membrane 212 of the coated glass panel 21 opposite the polaroid sheet 12, is used to receive the polarizing beam of the light source module 10 that transmits through the coated glass panel 21 and reflect the polarizing beam back to the coated glass panel 21 to form a resonant cavity between the coated glass panel 21 and the corner cube prism 22 and has multiple reflecting mirrors 221 reflecting the polarizing beam of the light source module 10. With reference to FIG. 2, the polarizing beam will be divided into multiple interferential stripes in the resonant cavity by the reflection and the transmission between the coated glass panel 21 and the corner cube prism 22.

Additionally, a detecting object 50 can be securely mounted on the corner cube prism 22 opposite the coated glass panel 21. The reflecting mirrors 221 are mounted in the corner cube prism 22 with angles to make the reflective polarizing beam parallel to the incident polarizing beam of the light source module 10. Consequently, the interferential stripes of the polarizing beam formed in the resonant cavity will not be influenced when the detecting object 50 is moved with the corner cube prism 22 with a tilt angle relative to the coated glass panel 21.

The wave-delay plate 23 is mounted between the coated glass panel 21 and the corner cube prism 22, is used to receive the polarizing beam of the light source module 10 reflected from the corner cube prism 22 and may be a one-eighth wave-delay plate.

The detecting device 30 faces the coated glass panel 21 of the resonator module 20 opposite the corner cube prism 22, is used to receive the interferential stripes formed in the resonator module 20 and has a polarizing beam splitter 31 (PBS), two power detectors 32 (PD) and a signal processor 33.

The polarizing beam splitter 31 faces the front side of the glass panel 211, is used to receive the interferential stripe formed in the resonator module 20 and split the interferential stripe into two sub-beams.

The power detectors 32 are mounted near the polarizing beam splitter 31, are respectively used to receive and detect the sub-beams split by the polarizing beam splitter 31 and respectively form signals corresponding to the sub-beams of the interferential stripe.

The signal processor 33 are electrically connected to the power detectors 32 and is used to calculate and analyze the signals corresponding to the sub-beams of the interferential stripe to measure the displacement of the detecting object 50 mounted securely on the corner cube prism 22.

When the multi-beam interferometer displacement measuring system utilized in the large measuring range in accordance with the present invention is used to measure the displacement of a detecting object 50, the detecting object 50 is securely mounted on the corner cube prism 22 opposite the coated glass panel 21. Then, with reference to FIGS. 1 and 2, a non-polarizing beam is emitted from the emitter 11 and into the polaroid sheet 12, and the polaroid sheet 12 transforms the non-polarizing beam into a polarizing beam as an incident beam ($A_i$). The incident beam ($A_i$) emits through the coated glass panel 21 and spreads into the resonant cavity between the coated glass panel 21 and the corner cube prism 22 to travel backwards and forwards to divide into multiple interferential stripes ($A_j$, j=1, 2, 3 . . . n). If a fast axis of the wave-delay plate 23 is rotated to a direction of the s-polarization, the electric field of the interferential stripe (s-polarization) can be described in equation (1) as follow:

$$E_{sn}=A_s \times T \times R^{n-1} \times \cos(\omega t + kx + (2n-1) \cdot \delta) \quad (1)$$

$A_S$ is the amplitude in the s-polarization direction, R is the reflection ratio, T is the perforation ratio (in an idealized condition, T=1−R), ωt is the original phase angle, kx is the light-wave phase angle, δ is the light-wave phase angle formed by the displacement=4πd/λ, d is the distance between the coated glass panel 21 and the corner cube prism 22, and λ is the wavelength.

The sum of the electric field of the s-polarization interferential stripe is driven as equations (2) and (3) as follows:

$$E_s=+E_{s1}+E_{s2}+E_{s3}+ \ldots +E_{sn}(n=\delta) \quad (2)$$

$$E_s=A_s \times T \times e^{i(\omega t + kx)} \times e^{i\delta}/1-R \cdot e^{i2\delta} \quad (3)$$

The intensity ($I_s$) of the s-polarization interferential stripe can be calculated by equations (2) and (3) to obtain equation (4) as follows:

$$I_s=E_s \cdot E_s^* = I_{s0} \times T^2/(1+R^2-2 \times R \times \cos(8\pi d/\lambda)) \quad (4)$$

$E_s^*$ is the conjugate parameter of $E_s$.

If the fast axis of the wave-delay plate 23 is defined in the s-polarization direction, the direction of the slow axis of the wave-delay plate 23 can be defined in the p-polarization. The direction of the slow axis (p-polarization) of the wave-delay plate 23 is perpendicular to the direction of the fast axis (s-polarization) of the wave-delay plate 23. The intensity ($I_p$) of the p-polarization interferential stripe can be described in equation (5) as follows:

$$I_p=I_{s0} \times T^2/(1+R^2-2 \times R \times \cos(8\pi d/\lambda + \pi/2)) \quad (5)$$

When the interferential stripe emits through the coated glass panel 21 and emits into the polarizing beam splitter 31, the polarizing beam splitter 31 of the detecting device 30 will split the interferential stripe into two sub-beams (for example: s-polarization and p-polarization direction beams). Then, the power detectors 32 respectively receive and detect the sub-beams split by the polarizing beam splitter 31 and respectively form crossed signals corresponding to the sub-beams (s-polarization and p-polarization directions) of the interferential stripe. The signal processor 33 can calculate and analyze the crossed signals corresponding to the sub-beams of the interferential stripe to obtain the periodicity of the interferential stripe. Then, the displacement of the detecting object 50 securely mounted on the corner cube prism 22 can be measured and equals to the periodicity of the interferential stripe multiply the ⅛ wavelength of the He—Ne Laser.

Figure 3:
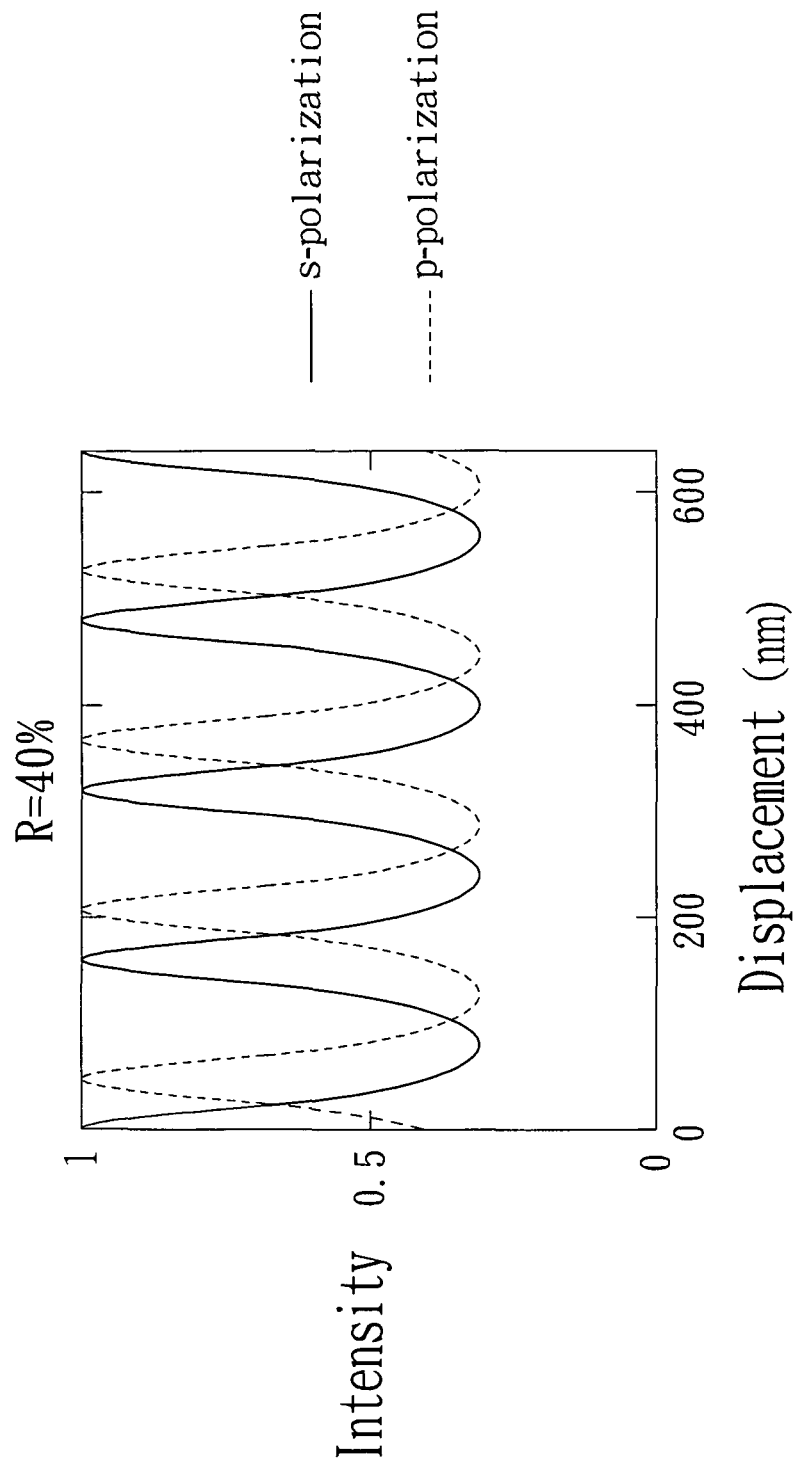
FIG. 3 is a diagram of intensity distributions of s-type and p-type signals of the multi-beam interferometer displacement measuring system in FIG. 1 under a 40% reflection ratio.
Figure 4:
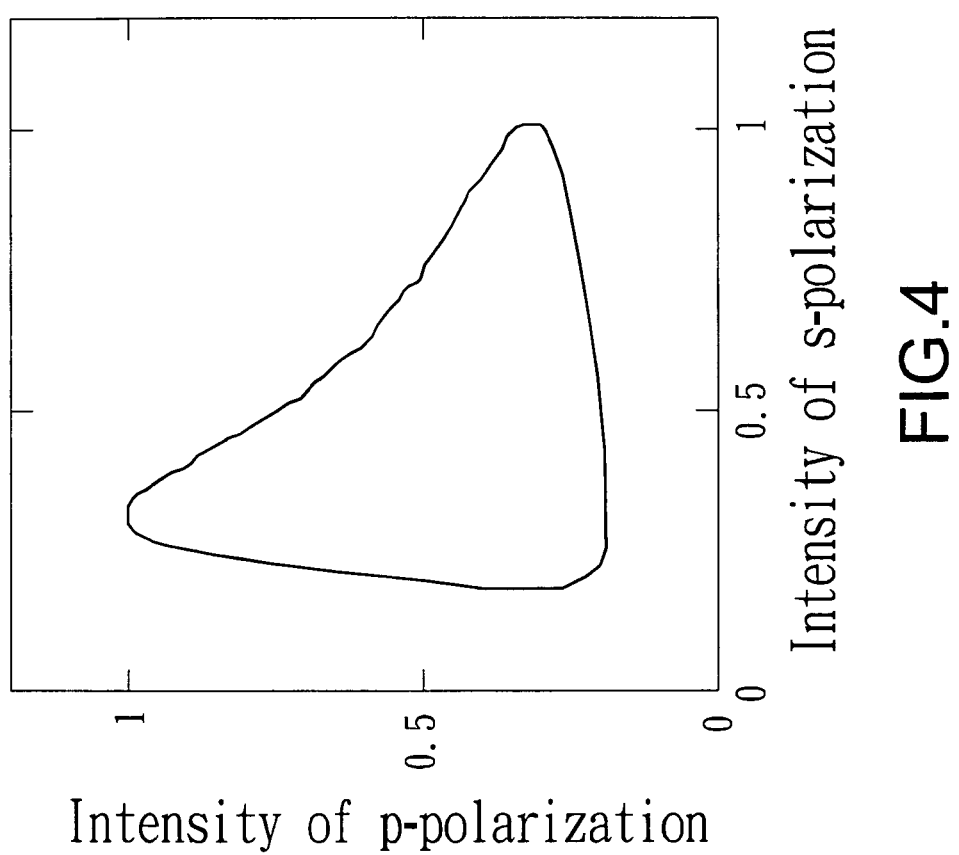
FIG. 4 is a diagram of Lissajou's figure of the signals of the multi-beam interferometer displacement measuring system in FIG. 1 under a 40% reflection ratio.
Figure 5:
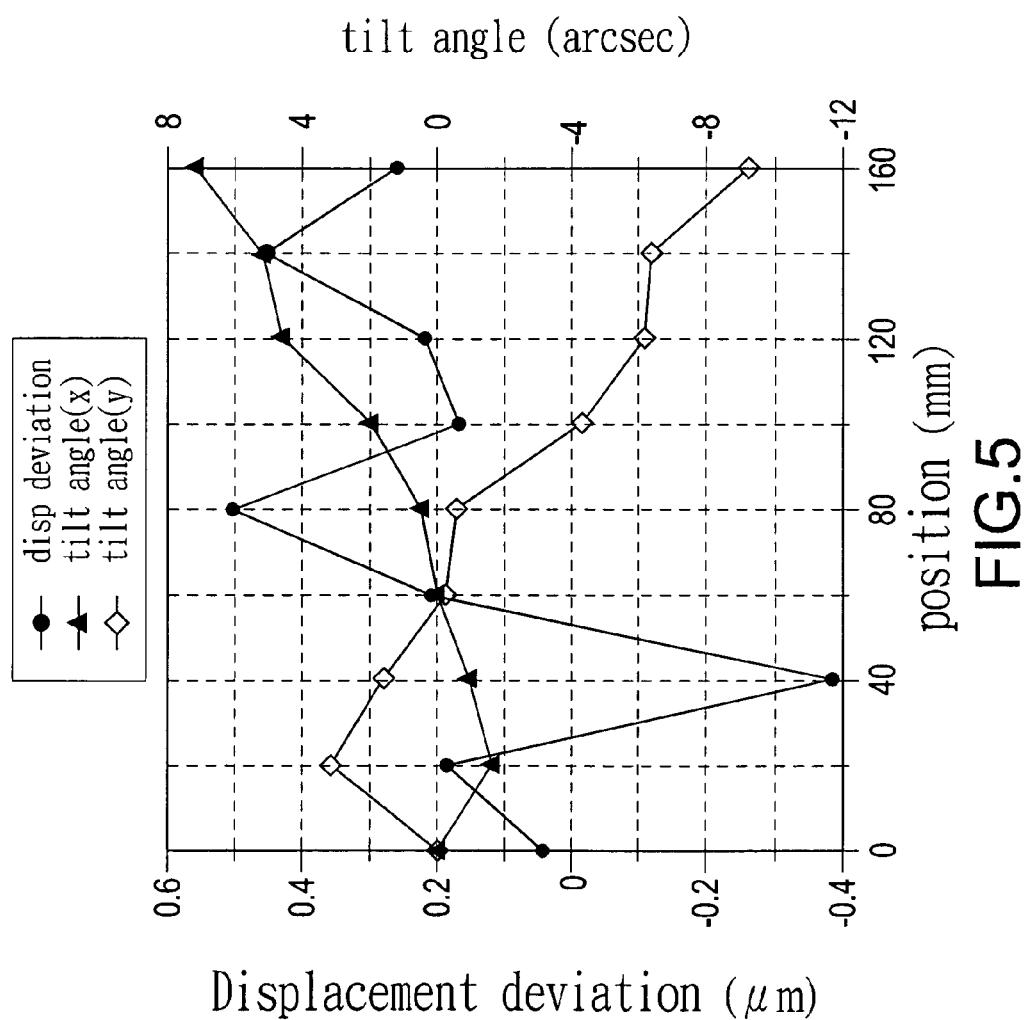
FIG. 5 is an experimental coordinate diagram of the multi-beam interferometer displacement measuring system in FIG. 1.
Figure 6:
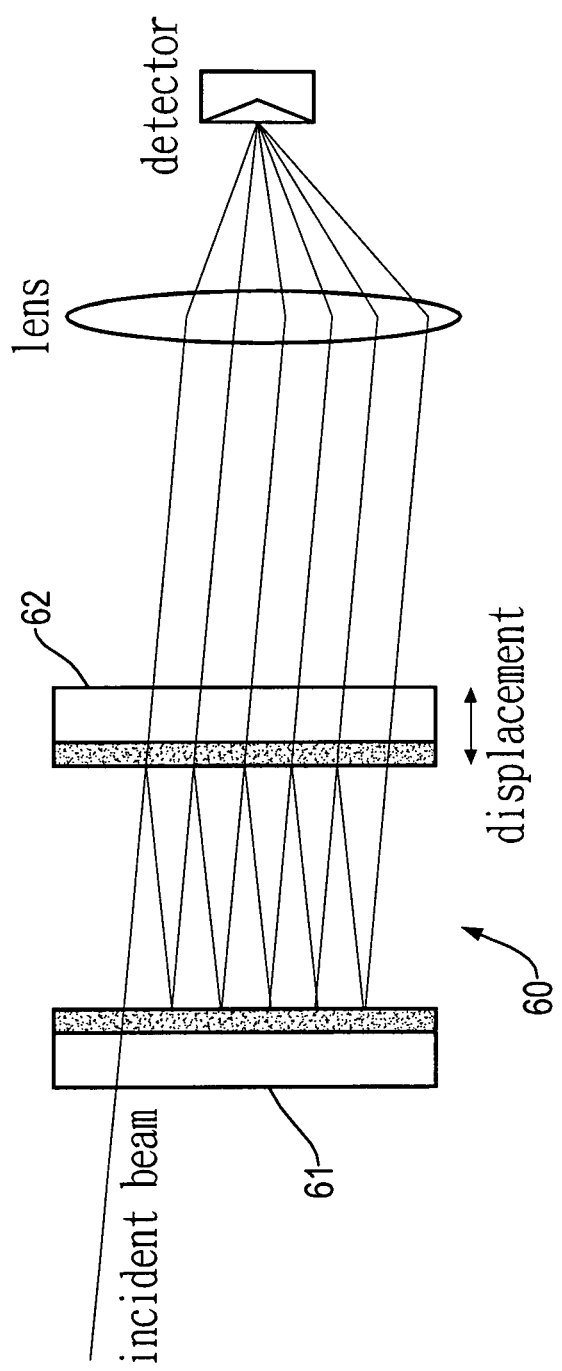
FIG. 6 is a side view of a Fabry-Perot interferometer in accordance with the prior art.

After the above-mentioned theoretical simulation of crossed signals of the interferometric stripes, the interaction graph (when R=40%) between the intensities ($I_s$, $I_p$) and the displacement of the detecting object 50 is shown in FIG. 3. In addition, the Lissajou's figure of the two crossed signals of the interferometric stripes also can be calculated and shown in FIG. 4. Furthermore, with reference to FIG. 5, the experimental results show that when the displacement between the coated glass panel 21 and the corner cube prism 22 is 0~160 millimeter (mm), the displacement deviation is less than 0.5 micrometer (μm) and the tilt angle is less than ±9 arcsec and this means that the tilt angle is not a critical parameter for the multi-beam interferometer displacement measuring system in accordance with the present invention and also can prove that the multi-beam interferometer displacement measuring system in accordance with the present invention is feasible for precision displacement measurement in the large range.

With the optical path arrangement of the multi-beam interferometer displacement measuring system in accordance with the present invention, the reflecting mirrors 221 of the corner cube prism 22 enable the reflective polarizing beam parallel the incident polarizing beam of the light source module 10, the multi-beam interferometer displacement measuring system will be insensitive to the tilt angle and the optical resolution (with a resolution about 40 nanometers) will be better than that of the conventional Michelson interferometer or the Fabry-Perot interferometer 60, and this will be beneficial to realize the high precision displacement in the large measuring range and under the uncomplicated measuring condition.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A multi-beam interferometer displacement measuring system utilized in a large measuring range comprising:
    a light source module having
        an emitter emitting a non-polarizing beam; and
        a polaroid sheet used to receive the non-polarizing beam emitted from the emitter and transforming the non-polarizing beam into a polarizing beam;
    a resonator module used to receive the polarizing beam of the light source module and having
        a coated glass panel mounted away from the polaroid sheet opposite the emitter to receive the polarizing beam of the light source module, used to reflect the polarizing beam back to the polaroid sheet and the polarizing beam transmitting through the coated glass panel;
        a corner cube prism movably facing the coated glass panel opposite the polaroid sheet, used to receive the polarizing beam of the light source module that is transmitted through the coated glass panel and reflects the polarizing beam back to the coated glass panel to form a resonant cavity between the coated glass panel and the corner cube prism and having multiple reflecting mirrors reflecting the polarizing beam of the light source module to divide the polarizing beam into multiple interferential stripes; and
        a wave-delay plate mounted between the coated glass panel and the corner cube prism and used to receive the polarizing beam of the light source module reflected from the corner cube prism; and
    a detecting device facing the coated glass panel of the resonator module opposite the corner cube prism, used to receive the interferential stripes formed in the resonator module and having
        a polarizing beam splitter facing the coated glass panel opposite the wave-delay plate, used to receive the interferential stripe formed in the resonator module and split the interferential stripe into two sub-beams;
        two power detectors mounted near the polarizing beam splitter, respectively used to receive and detect the sub-beams split by the polarizing beam splitter and respectively form signals corresponding to the sub-beams of the interferential stripe; and
        a signal processor electrically connected to the power detectors and used to calculate and analyze the signals corresponding to the sub-beams of the interferential stripe to measure the displacement of the corner cube prism.

2. The multi-beam interferometer displacement measuring system as claimed in claim 1, wherein the wave-delay plate is a one-eighth wave-delay plate.

3. The multi-beam interferometer displacement measuring system as claimed in claim 2, wherein the coated glass panel has
    a glass panel facing the polaroid sheet opposite the emitter and having
        a front side facing the polaroid sheet opposite the emitter; and
        a rear side; and
    a coating membrane mounted on the rear side of the glass panel, used to reflect the polarizing beam of the light source module back to the polaroid sheet and having a reflection ratio of R %, R is a parameter.

4. The multi-beam interferometer displacement measuring system as claimed in claim 3, wherein the emitter is a helium-neon laser and is collimated to make the multi-beam interferometer displacement measuring system obtain a preferred measuring effect.

5. The multi-beam interferometer displacement measuring system as claimed in claim 1, wherein the emitter is a helium-neon laser and is collimated to make the multi-beam interferometer displacement measuring system to obtain a preferred measuring effect.

6. The multi-beam interferometer displacement measuring system as claimed in claim 1, wherein the coated glass panel has
    a glass panel facing the polaroid sheet opposite the emitter and having
        a front side facing the polaroid sheet opposite the emitter; and
        a rear side; and
    a coating membrane mounted on the rear side of the glass panel, used to reflect the polarizing beam of the light source module back to the polaroid sheet and having a reflection ratio of R %, R is a parameter.

7. The multi-beam interferometer displacement measuring system as claimed in claim 6, wherein the emitter is a helium-neon laser and is collimated to make the multi-beam interferometer displacement measuring system obtain a preferred measuring effect.

* * * * *